March 4, 1958   C. A. NICHOLS ET AL   2,825,124
METHOD OF MAKING A FABRICATED ROTOR
Filed Feb. 5, 1952   3 Sheets-Sheet 1
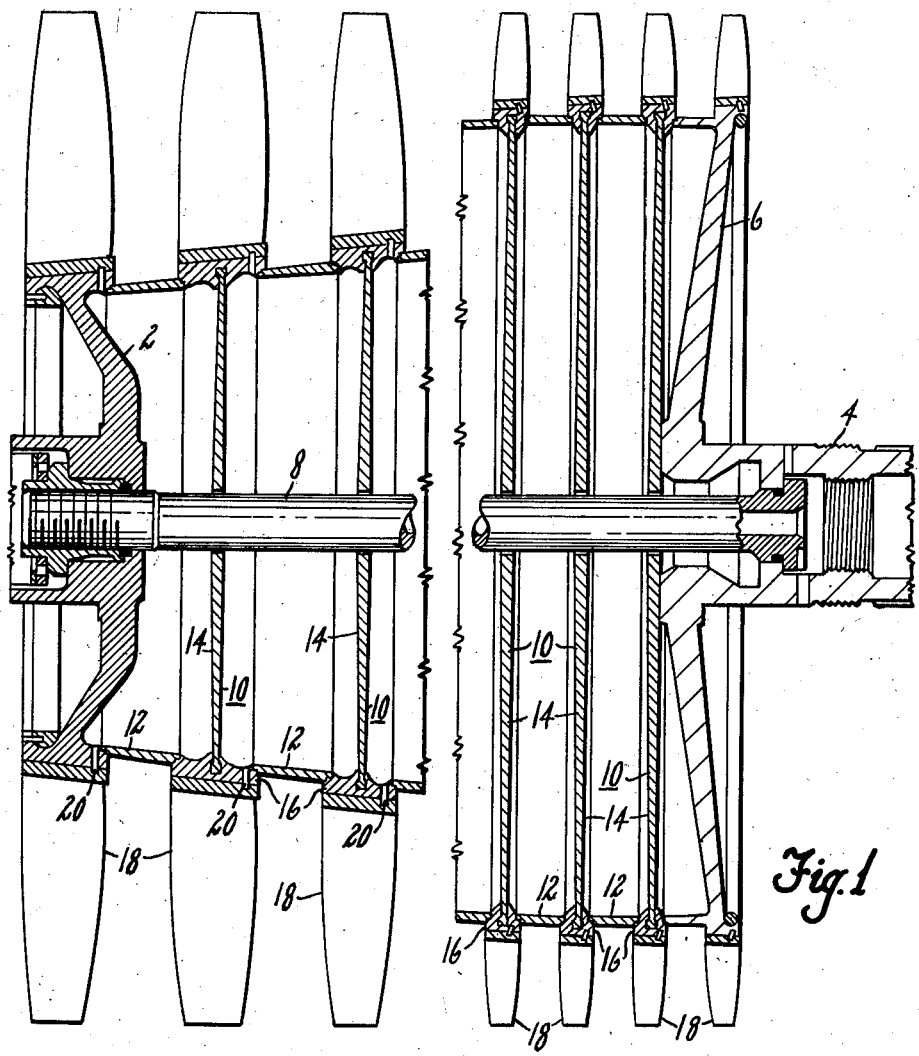
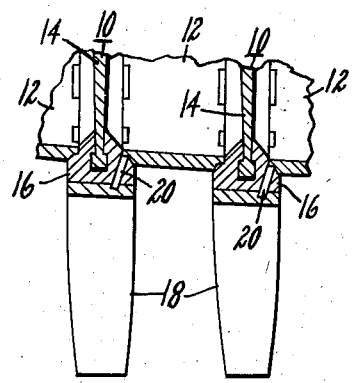
INVENTORS
CHARLES A. NICHOLS
BY   GEORGE L. WEISER
THEIR ATTORNEYS March 4, 1958  C. A. NICHOLS ET AL  2,825,124
METHOD OF MAKING A FABRICATED ROTOR
Filed Feb. 5, 1952  3 Sheets-Sheet 2

INVENTORS
CHARLES A. NICHOLS
BY  GEORGE L. WEISER
THEIR ATTORNEYS

INVENTOR.
CHARLES A. NICHOLS
BY GEORGE L. WEISER

THEIR ATTORNEYS

United States Patent Office 2,825,124
Patented Mar. 4, 1958

2,825,124

METHOD OF MAKING A FABRICATED ROTOR

Charles A. Nichols, Anderson, and George L. Weiser, Middletown, Ind., assignors to General Motors Corporation, Detroit, Mich., a corporation of Delaware Application February 5, 1952, Serial No. 270,071

2 Claims. (Cl. 29—156.8)

This invention relates to high strength, fabricated rotors and more particularly to the manufacture of compressor wheels for gas turbine engines.

Axial flow compressors for aircraft gas turbine engines generally include a large number of stages. The compressor rotor is built up of a series of interlocked wheels, each wheel having a rim which supports a row of blades and a center disk which acts as a tension member for the rim. These wheels are presently made by forging and machining aluminum or stainless steel stock, and while they perform satisfactorily, they are very expensive to manufacture, inasmuch as only a few presses are existent which are large enough for the forging operation, and because of the extensive machining required to finish a forged wheel.

The primary object of this invention is to provide a method for fabricating a high strength wheel from metal stock wherein an outer rim or ring and an inner disk are made separate and are shrunk together in interlocked relation.

In carrying out these objects it is a further object to form a ring having an annular groove in its inner periphery, to form a disk having a doubly flanged outer edge, and then to shrink the ring about the disk so that the outer edge of the disk is well fitted within the groove, and finally to interlock the assembly by swaging the edges of the groove against the disk.

Further objects and advantages of the present invention will be apparent from the following description, reference being had to the accompanying drawings, wherein a preferred form of the present invention is clearly shown.

In the drawings:

Fig. 1 is a sectional view of an axial flow compressor rotor;

Fig. 2 is an enlarged partial section of Fig. 1;

Figure 3:
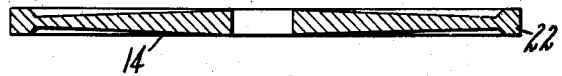
Fig. 3 is a sectional view of a compressor wheel disk.

Referring now to the drawings in detail and more particularly to Fig. 1, it will be noted that the compressor rotor generally includes an interlocked series of wheels, each wheel having a peripheral row of blades. The end wheel 2 is connected to the drive shaft 4 of the end wheel 6 by a tie bolt 8 and a series of intermediate wheels 10 and spacers 12. The wheels 10 each include a disk 14, a ring 16, and blades 18. The spacers 12 are notched between the wheels, as illustrated in Fig. 2, so that the drive will be through the rings 16 and spacers 12 rather than through the tie bolt 8. The blades 18 are dovetailed into peripheral slots in the ring 16 and are restrained from sliding in the slots by the pins 20.

The disks 14 are primarily tension members and are made of a low alloy steel, preferably from cross-rolled stock such as is generally used in the manufacture of circular saws; the cross-rolling giving equal physical properties in all directions.

Fig. 3 illustrates a disk 14 and it is noted that the disk has an increasing taper in an axial direction from the flanged rim 22. The disk 14 is initially a flat piece of stock, and each taper is formed by flexing the disk against a concave block, which block is then rotated while a cutting tool traverses the disk radially of its axis of rotation. When the disk is released from the block it will spring back to its original plane revealing a tapered surface. After the disk has been machined for taper, it is heat-treated to about a Rockwell hardness of 45 and is then finish ground.

Figure 4:
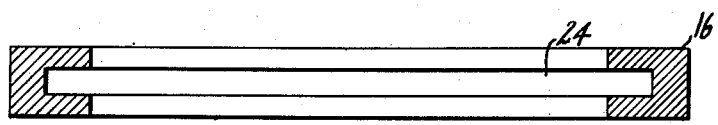
Fig. 4 is a sectional view of a compressor wheel ring.

The ring 16 is formed of stainless steel bar stock which is rolled into a hoop and welded. A channel 24 is then machined into the ring 16 so that it will have the cross sectional shape illustrated by Fig. 4. After machining the ring 16 is heat-treated to about a Rockwell hardness of 29, and is then ground.

Figure 5:
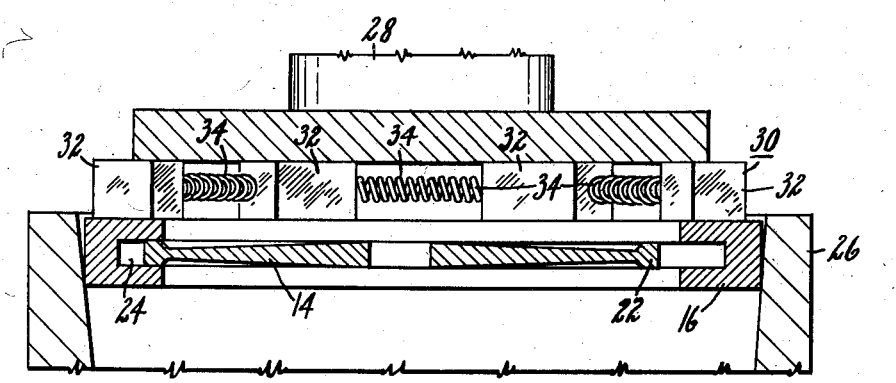
Figs. 5 and 6 are sectional views illustrating the initial assembling of a ring and disk.
Figure 6:
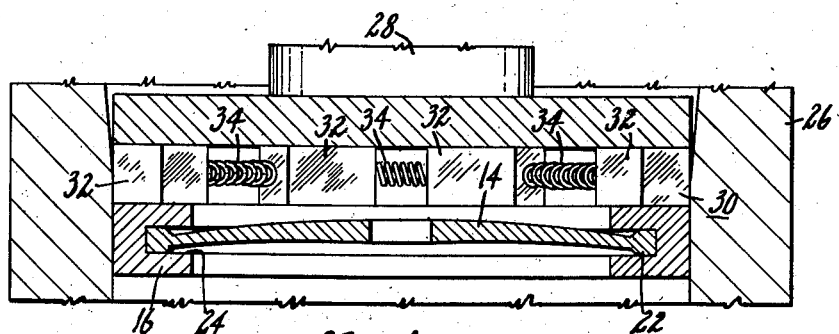

The outside diameter of the disk 14 is slightly less than the bore of the ring 16 so that the disk can be located in the channel 24. The ring 16 is next shrunk or collapsed around the disk 14 by a cold-working operation. Figs. 5 and 6 illustrate how the ring 16 may be collapsed by pressing the ring and disk assembly through a draw die. The draw die includes a fixed hollow cylindrical die 26 having a tapered inner wall and a movable ram 28. The ring and disk assembly is placed in the die 26 and thereafter a collapsible pressure block 30, which includes a series of wedge-shaped blocks 32 joined by the intermediate springs 34, is placed on the ring 16. The ram 28 then forces the pressure block 30, the ring 16 and disk 14 in assembled relation through the draw die, shrinking the ring 16 around the disk 14. It should be noted here that the ring 16 is shrunk to an extent that will cause a predetermined oil-canning or buckling of the disk 14, as illustrated in Fig. 6, which buckling will disappear when the ring and disk are removed from the draw die due to a slight expansion of the ring.

Figure 7:
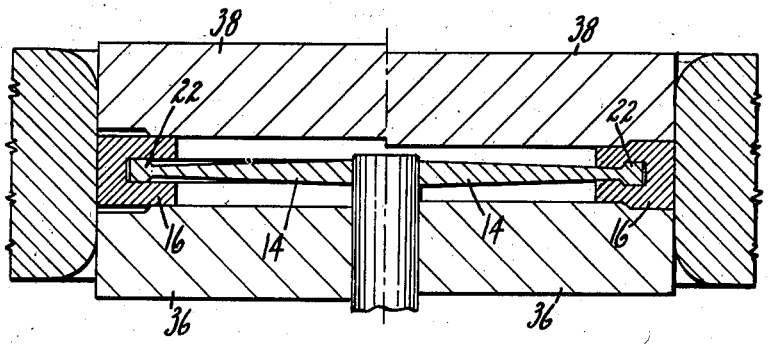
Fig. 7 is a sectional view illustrating the final assembling of a ring and disk.

Following the shrinking operation, the ring 16 and disk 14 are mechanically joined together by a pair of dies 36 and 38, which will swage the ring 16 around the rim 22 of the disk 14, as illustrated by Fig. 7.

Figure 8:
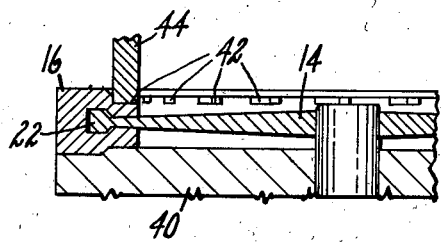
Fig. 8 is a sectional view illustrating the notching of a wheel to provide a drive connection.
Figure 9:
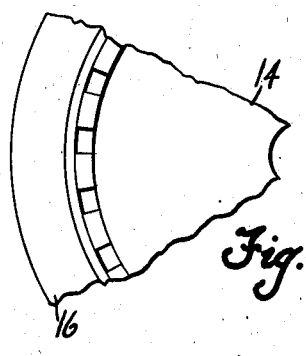
Fig. 9 is a partial plan view of a wheel after notching.

The wheel is next placed on a rotatable indexing plate 40, and a series of notches 42 are stamped into the sides of the ring 16 by a punch 44, as illustrated in Fig. 8.

Figure 10:
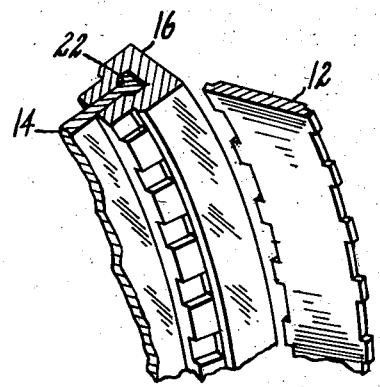
Fig. 10 is an exploded partial perspective of a wheel and spacer.

It should be noted here that the shrinking operation, the swaging operation, and the notching operation are preferably cold forming operations. The spacers 12, which were previously referred to, are made from strip stock that is welded into hoops, and the edges of the hoops are notched by broaching or shearing to correspond to the notches 42 in the rings 16. Fig. 10 illustrates a partial section of a spacer 12 and a ring 16 in position for interlocking engagement.

Figure 11:
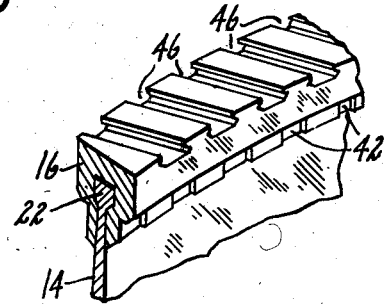
Fig. 11 is a partial perspective of a finished wheel.

Fig. 11 illustrates a fragmentary view in perspective of a portion of a finished wheel rim; and it should be noted that, subsequent to the notching operation, a series of blade holding slots 46 were formed in the outer periphery of the wheel and the inner opposed edges of the notched portions were tapered.

While the embodiment of the present invention as herein disclosed constitutes a preferred form, it is to be understood that other forms might be adopted.

What is claimed is as follows:

1. The method for joining a metal disk to a relatively heavy metal ring comprising the steps of providing a metal disk having a bead surrounding its outer periphery, providing a metal ring including a straight-sided peripheral groove at its inner wall wherein the pitch diameter of said groove is greater than the outer diameter of said disk and wherein the inner diameter of said ring is slightly greater than the outer diameter of said disk, positioning the disk within the groove in said ring, mechanically radially shrinking the ring so as to place the disk under uniform peripheral compressive force, and then swaging the ring in a plane normal to the plane of the disk for interlocking the inner edges of the ring with the bead of said disk.

2. The method for joining a stainless steel disk to a relatively heavy stainless steel ring comprising the steps of providing a metal disk having a bead surrounding its outer periphery, providing a metal ring including a straight-sided peripheral groove at its inner wall wherein the pitch diameter of said groove is greater than the outer diameter of said disk and wherein the inner diameter of said ring is slightly more than the outer diameter of said disk, positioning the disk within the groove in said ring, pressing the assembled ring and disk through a tapered die for radially uniformly collapsing the ring to a reduced diameter for holding the disk centered within its groove, and finally simultaneously swaging the inner diameter of the disk from opposite sides thereof for interlocking the groove of the disk with the bead on said rim.

References Cited in the file of this patent

UNITED STATES PATENTS

| | | |
|---|---|---|
| 905,487 | Worsey | Dec. 1, 1908 |
| 1,110,092 | Williams | Sept. 8, 1914 |
| 1,372,246 | Putnam | Mar. 22, 1921 |
| 1,423,109 | Hellen | July 18, 1922 |
| 1,433,478 | Rogatchoff | Oct. 24, 1922 |
| 1,660,506 | Hamilton | Feb. 8, 1928 |
| 1,877,358 | Morf | Sept. 13, 1932 |
| 1,947,462 | Doorbar | Feb. 20, 1934 |
| 2,110,530 | Saines | Mar. 8, 1938 |
| 2,198,149 | Bangert | Apr. 23, 1940 |
| 2,292,421 | Wolf | Aug. 11, 1942 |
| 2,354,439 | Brink | July 25, 1944 |
| 2,438,867 | Rockwell et al. | Mar. 30, 1948 |
| 2,483,610 | Bauman | Oct. 4, 1949 |
| 2,526,146 | Luft | Oct. 17, 1950 |
| 2,573,875 | Riffiford | Nov. 6, 1951 |
| 2,663,073 | Bieber | Dec. 22, 1953 |

FOREIGN PATENTS

| | | |
|---|---|---|
| 85,911 | Germany | Mar. 23, 1896 |